United States Patent
Gajdel et al.

(10) Patent No.: US 12,423,167 B1
(45) Date of Patent: Sep. 23, 2025

(54) SYSTEMS AND METHODS FOR GENERATING AN AUTOMATED WORKFLOW

(71) Applicant: STAN A.I. CORP., North York (CA)

(72) Inventors: Maximilian Gajdel, Whitby (CA); Bogdan Raic, Richmond Hill (CA)

(73) Assignee: STAN A.I. CORP., North York (CA)

( * ) Notice: Subject to any disclaimer, the term of this patent is extended or adjusted under 35 U.S.C. 154(b) by 0 days.

(21) Appl. No.: 18/963,948

(22) Filed: Nov. 29, 2024

(51) Int. Cl.
| | |
|---|---|
| *G06F 9/54* | (2006.01) |
| *G06F 9/451* | (2018.01) |
| *G06F 40/226* | (2020.01) |
| *G06F 40/40* | (2020.01) |
| *G06F 3/0484* | (2022.01) |

(52) U.S. Cl.
CPC ............. *G06F 9/543* (2013.01); *G06F 9/451* (2018.02); *G06F 40/226* (2020.01); *G06F 40/40* (2020.01); *G06F 3/0484* (2013.01)

(58) Field of Classification Search
None
See application file for complete search history.

(56) References Cited

U.S. PATENT DOCUMENTS

| | | | |
|---|---|---|---|
| 2023/0046322 A1* | 2/2023 | Rastogi | .................. G06F 9/451 |
| 2023/0419220 A1* | 12/2023 | Sonaty | ............... G06Q 10/0633 |

* cited by examiner

Primary Examiner — Craig C Dorais

(57) ABSTRACT

Systems and methods for generating an automated workflow. A workflow generation request is received as a textual natural language input through a workflow generation user interface on a user device. The request defines a desired automated operation. A proposed automated workflow is determined as a sequence of sub-operations required to perform the desired automated operation. The sequence of sub-operations is determined by determining, based on the natural language input, at least one desired output to be generated by the desired automated operation; determining one or more output operations usable to generate the at least one desired output; and defining the sequence of sub-operations to include a plurality of sub-operations arranged into a sequence concluding with the one or more output operation. A representation of the proposed automated workflow is then displayed in the workflow generation user interface on the user device.

29 Claims, 4 Drawing Sheets

SYSTEMS AND METHODS FOR GENERATING AN AUTOMATED WORKFLOW

FIELD

The present disclosure relates to generating an automated workflow, and in particular, methods and systems for generating an automated workflow using natural language inputs.

BACKGROUND

The following is not an admission that anything discussed below is part of the prior art or part of the common general knowledge of a skilled in the art.

As industries become more complex, the manual performance of repetitive tasks can create bottlenecks and limit scalability. Automation of repetitive and simple tasks helps streamline operations and frees up resources for more complex or involved tasks. Automation may also ensure that workflows are appropriately sequenced and executed, resulting in more efficient execution of even simple tasks.

Traditionally, automations are built from the ground up. Developers design custom processes, code the process using the appropriate software tools, and deploy the automation after rigorous testing. This process involves manually defining the sequence of sub-operations to be performed in order to complete a specific task, including manually identifying the sub-operations to be performed as part of the sequence. This process can be challenging and time consuming, particularly for less tech-savvy users. As a result, many individuals and organizations continue to perform tasks that could be automated through inefficient and time-consuming manual processes.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The present disclosure provides systems and methods for generating an automated workflow. A workflow generation request (e.g., a text prompt) can be received from a user device in a natural language prompt. The workflow generation request defines a desired operation (i.e., workflow) that the user wishes to automate. The sequence of sub-operations (i.e., actions) that are required to build the desired workflow can then be determined automatically in response to the workflow generation request.

At least one output to be generated from the workflow can be determined based on the workflow generation request. The at least one output can reflect a desired final output that is intended to be the result of the automated workflow that is requested. At least one output operation capable of providing the desired output can also be determined. A sequence of actions required to execute the workflow can then be determined. The sequence of actions can be defined as a proposed workflow in response to the workflow generation request. The proposed workflow can be represented in a user interface on the user device. The proposed workflow can be represented in the user interface as a natural language representation of the proposed workflow that reflects the sequence of actions described using a natural language output. The proposed workflow can also be stored in a non-transitory memory for future use and execution, optionally in response to a user approving the proposed workflow.

In accordance with one aspect of this disclosure, which may be used alone or in combination with any other aspect, there is provided a computer-implemented method for generating an automated workflow, the method comprising: receiving a workflow generation request through a workflow generation user interface on a user device, the workflow generation request defining a desired automated operation, wherein the workflow generation request is received as a textual natural language input from the user device; determining a proposed automated workflow as a sequence of sub-operations required to perform the desired automated operation, wherein determining the sequence of sub-operations comprises: determining, based on the natural language input, at least one desired output to be generated by the desired automated operation; determining one or more output operations usable to generate the at least one desired output; and defining the sequence of sub-operations to include a plurality of sub-operations arranged into a sequence concluding with the one or more output operation; displaying a representation of the proposed automated workflow in the workflow generation user interface on the user device.

The method can include storing the sequence of sub-operations for the automated workflow in a non-transitory workflow storage memory.

The method can include automatically executing the sequence of sub-operations in response to a request to execute the automated workflow.

The sequence of suboperations can include a sequence of application programming interface (API) calls to a plurality of different operational applications.

Determining the sequence of sub-operations can include identifying one or more user-specific data repositories associated with a user of the user device; defining one or more user-specific integrations for one or more sub-operations in the sequence of the sub-operations, wherein each user-specific integration specifies that the sub-operation is to be performed using a corresponding user-specific data repository corresponding to that sub-operation and defines any necessary application programming interface (API) calls required to access data from the corresponding user-specific data repository.

The plurality of available sub-operations can be pre-defined and stored in a sub-operation database, and determining the sequence of sub-operations comprises identifying the sequence of available sub-operations from the sub-operation database usable to perform the desired automated operation.

Determining the sequence of sub-operations can include determining one or more workflow inputs expected to be received in conjunction with a request to execute the automated workflow; and determining the sequence of available sub-operations from the sub-operation database usable to generate the desired output based on the one or more workflow inputs.

The desired output and the one or more workflow inputs can be determined based on parsing of the workflow generation request.

The method can include automatically determining the one or more workflow inputs in response to a request to execute the automated workflow.

The method can include validating a sequence of intermediate inputs and intermediate outputs for each sequential pair of sub-operations within the sequence of sub-operations.

The method can include displaying, in the workflow generation user interface on the user device, the sequence of sub-operations identified for the automated workflow.

The method can include generating a natural language description of the sequence of sub-operations identified for the automated workflow; and displaying, in the workflow generation user interface on the user device, the natural language description of the sequence of sub-operations.

The method can include displaying, in the workflow generation user interface on the user device, a workflow validation prompt in association with displaying the natural language description; receiving, via the workflow generation user interface, a user validation input using the workflow validation prompt; and storing the sequence of sub-operations for the automated workflow in response to receiving the user validation input.

The method can include receiving, a workflow modification input through the workflow generation user interface in response to displaying the natural language description of the sequence of sub-operations, where the workflow modification input defines a desired modification to the sequence of sub-operations as a modification textual natural language input from the user device; determining a modified sequence of sub-operations by modifying the sequence of sub-operations in the proposed automated workflow in response to the workflow modification input; and storing the modified sequence of sub-operations for the proposed automated workflow in a non-transitory workflow storage memory.

In an aspect of this disclosure, there is provided a system for generating an automated workflow, the system comprising: a processor; and a non-transitory storage memory; wherein the processor is configured to: receive a workflow generation request through a workflow generation user interface on a user device in communication with the processor, the workflow generation request defining a desired automated operation, wherein the workflow generation request is received as a textual natural language input from the user device; determine a proposed automated workflow as a sequence of sub-operations required to perform the desired automated operation, wherein determining the sequence of sub-operations comprises: determining, based on the natural language input, at least one desired output to be generated by the desired automated operation; determining one or more output operations usable to generate the at least one desired output; and defining the sequence of sub-operations to include a plurality of sub-operations arranged into a sequence concluding with the one or more output operation; and transmit a representation of the proposed automated workflow to the user device whereby the representation of the proposed automated workflow is displayable in the workflow generation user interface on the user device.

The processor can be further configured to store the sequence of sub-operations for the proposed automated workflow in the non-transitory storage memory.

The processor can be further configured to automatically execute the sequence of sub-operations in response to a request to execute the automated workflow.

The sequence of sub-operations can include a sequence of application programming interface (API) calls to a plurality of different operational applications.

The processor can be further configured to determine the sequence of sub-operations by: identifying one or more user-specific data repositories associated with a user of the user device; and defining one or more user-specific integrations for one or more sub-operations in the sequence of the sub-operations, where each user-specific integration specifies that the sub-operation is to be performed using a corresponding user-specific data repository corresponding to that sub-operation and defines any necessary application programming interface (API) calls required to access data from the corresponding user-specific data repository.

A plurality of available sub-operations can be predefined and stored in the non-transitory storage memory, and the processor can be configured to determine the sequence of sub-operations by identifying the sequence of available sub-operations from the non-transitory storage memory usable to perform the desired automated operation.

The processor can be configured to determine the sequence of sub-operations by: determining one or more operation inputs expected to be received in conjunction with a request to execute the automated workflow; and determining the sequence of available sub-operations from the sub-operation database usable to generate the desired output based on the one or more operation inputs.

The processor can be configured to determine the desired output and the one or more operation inputs based on parsing of the workflow generation request.

The processor can be configured to automatically determine the one or more operation inputs in response to a request to execute the automated workflow.

The processor can be configured to validate a sequence of intermediate inputs and intermediate outputs for each sequential pair of sub-operations within the sequence of sub-operations.

The processor can be configured to: transmit the sequence of sub-operations identified for the automated workflow to the user device whereby the sequence of sub-operations is displayable in the workflow generation user interface on the user device.

The processor can be configured to: generate a natural language description of the sequence of sub-operations identified for the automated workflow; and transmit the natural language description of the sequence of sub-operations to the user device whereby the natural language description of the sequence of sub-operations is displayable in the workflow generation user interface on the user device.

The processor can be configured to: receive, via the workflow generation user interface, a user validation input provided in response to a workflow validation prompt displayed within the workflow generation user interface in association with displaying the natural language description; and store the sequence of sub-operations for the automated workflow in response to receiving the user validation input.

The processor can be configured to: receive, a workflow modification input through the workflow generation user interface following transmission of the natural language description of the sequence of sub-operations to the user device, where the workflow modification input defines a desired modification to the sequence of sub-operations as a modification textual natural language input from the user device; determine a modified sequence of sub-operations by modifying the sequence of sub-operations in the proposed automated workflow in response to the workflow modification input; and storing the modified sequence of sub-operations for the proposed automated workflow in the non-transitory storage memory.

In an aspect of this disclosure, there is provided a computer program product for generating an automated workflow, the computer program product comprising a non-transitory computer readable medium having computer executable instructions stored thereon, the instructions for configuring one or more processors to perform a method of generating the automated workflow, wherein the method comprises: receiving a workflow generation request through a workflow generation user interface on a user device, the workflow generation request defining a desired automated operation, wherein the workflow generation request is received as a textual natural language input from the user device; determining the automated workflow as a sequence of sub-operations required to perform the desired automated operation, wherein determining the sequence of sub-operations comprises: determining, based on the natural language input, at least one desired output to be generated by the desired automated operation; determining one or more output operations usable to generate the at least one desired output; and defining the sequence of sub-operations to include a plurality of sub-operations arranged into a sequence concluding with the one or more output operation; displaying a representation of the automated workflow in the workflow generation user interface on the user device; and storing the sequence of sub-operations for the automated workflow in a non-transitory workflow storage memory.

The computer-executable instructions can further include instructions for configuring the one or more processors to perform a method for generating an automated workflow as described herein.

It will be appreciated by a person skilled in the art that an apparatus, computer program product, system, or method disclosed herein may embody any one or more of the features contained herein and that the features may be used in any particular combination or sub-combination.

These and other aspects and features of various examples will be described in greater detail below.

BRIEF DESCRIPTION OF THE DRAWINGS

For a better understanding of the described examples and to show more clearly how they may be carried into effect, reference will now be made, by way of example, to the accompanying drawings in which.

Figure 1:
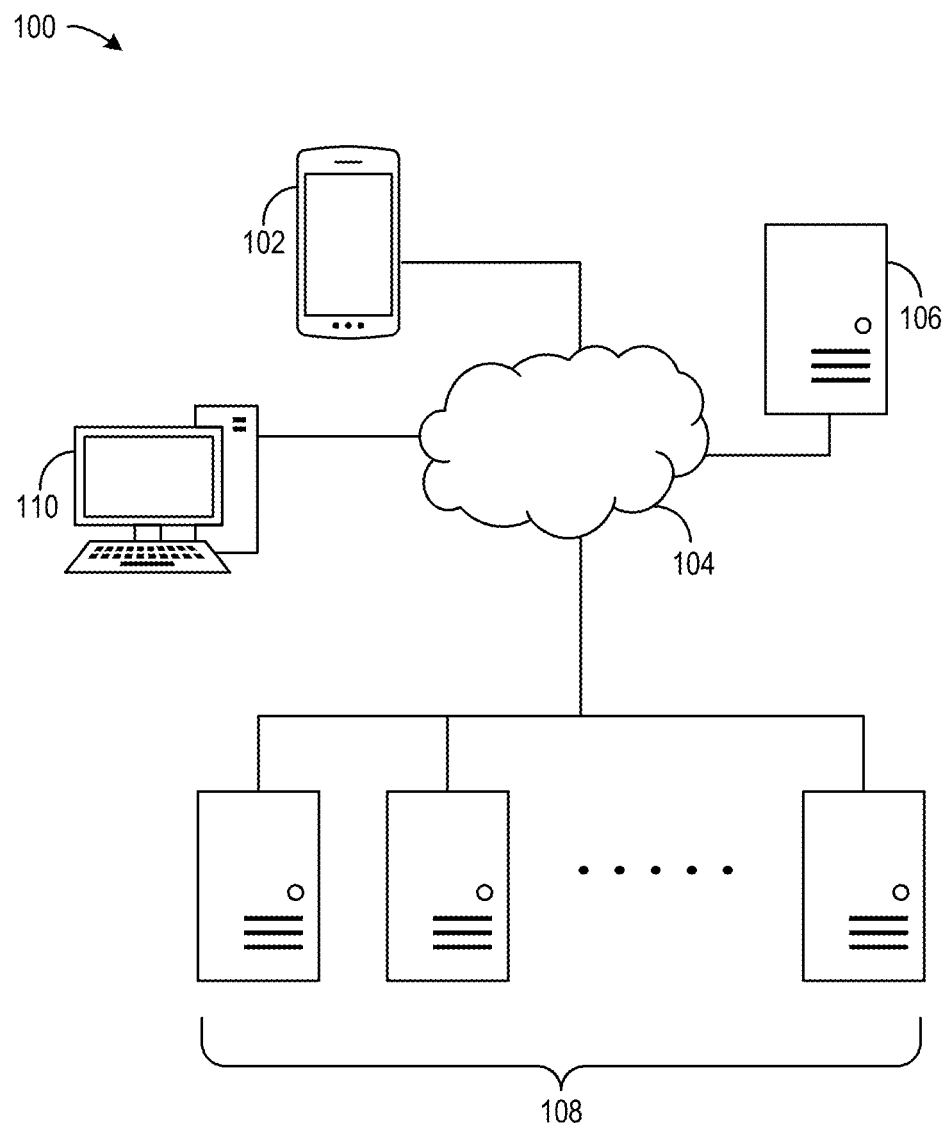
FIG. 1 is a block diagram of an example computer network system that can be used to provide an automated workflow generation system.

The drawings, described below, are provided for purposes of illustration, and not of limitation, of the aspects and features of various examples described herein. For simplicity and clarity of illustration, elements shown in the drawings have not necessarily been drawn to scale. The dimensions of some of the elements may be exaggerated relative to other elements for clarity.

DETAILED DESCRIPTION

Various systems or methods will be described below to provide an example of the claimed subject matter. No example described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an example that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. As used herein, two or more components are said to be "coupled", or "connected" where the parts are joined or operate together either directly or indirectly (i.e., through one or more intermediate components), so long as a link occurs. As used herein and in the claims, two or more parts are said to be "directly coupled", or "directly connected", where the parts are joined or operate together without intervening intermediate components.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The examples of the systems and methods described herein may be implemented as a combination of hardware or software. In some cases, the examples described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the examples described herein that may be implemented via software that is written in a high-level computer programming language such as object oriented programming or script-based programming. Accordingly, the program code may be written in Java, Swift/Objective-C, C, C++, Javascript, Python, SQL or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the examples described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. The computer program product may also be distributed in an over-the-air or wireless manner, using a wireless data connection.

The term "software application" "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Software applications may include mobile applications or "apps" for use on mobile devices such as smartphones and tablets or other "smart" devices.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications may be deployed to and installed on a computing device on which it is to operate. Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™. An application may also be accessed through an intermediary application, such as a web application that is accessed through a browser application operating on a computing device.

The present disclosure relates to systems and methods for generating automated workflows. The systems and methods described herein can be used to generate automated workflows through a user interface that the user interacts with using natural language inputs and prompts. The generation of an automated workflow can be initiated in response to a natural language workflow generation request.

Managing an organizing that has a large number of entities or customers can be a challenging experience. In particular, providing active and consistent user engagement is an important but challenging aspect of dealing with end-users/customers. To facilitate this process, automating simple and/or repetitive tasks can streamline a manager's personal task list and free up time and resources to deal with more complex tasks. However, many managers and small organizations may lack the skills and knowledge to effectively automate many tasks that involve coding or defining relationships between different electronic devices or data.

Furthermore, many organizations operate using different software tools and systems to manage different aspects of the organization and organizational functions. For instance, an organization may have an account with a first provider for a phone system, a separate software tool for an email system, a separate software platform for accounting purposes. In many cases, the software tools used by an organization (particularly smaller organizations such as property management companies for instance) may lack the ability to integrate and share information with other software tools. The software tools/applications may have open or closed APIs, further complicating the process of integrating multiple applications and data from multiple applications to manage tasks or multi-sequence tasks. In some cases, applications used by an organization may not provide or expose their API, further complicating the process of accessing data or functionality stored by those applications as part of an automated task.

Property managers are often tasked with dealing with problems relating to a large number of tenants/residents for one or more properties. Each of the tenants (and each of the properties) can have individual particularities that make it challenging for the manager to deal with their issues efficiently. However, many tasks may be consistent across tenants and/or properties. Enabling a property manager to automate some or all of these tasks can provide the manager with additional time and resources to apply towards managing more complex tasks and challenges.

For example, a property manager may need to remind a group of tenants about late rent payments. Responding individually to each tenant can be a time-consuming process, may result in inconsistent communications with tenants, and responses may be delayed depending on the number of tenants that require a reminder. Further, reminding a tenant that they are late on a rent payment requires a manager to identify the tenant, determine whether the tenant is late on their rent payment (e.g., by searching a database or spreadsheet), and crafting a message tailored to the specific tenant (e.g. specifying the tenant's address and rent payment owed). Although manually executing this workflow (i.e., individually for each tenant) for a small group of users is possible, the task becomes impractical when the group scales to larger numbers.

Managers may try to automate these repetitive tasks to save time and ensure attentiveness to their customers. Traditionally, automations are built using software development tools. However, the programming knowledge required to build automations can make these solutions inaccessible.

Building automations using existing automation applications often requires a level of technical expertise that can be unwelcoming to some users. Although users may no longer need to code these tasks from scratch, they still need to determine the underlying logic required to realize their workflows. Further, users need to understand the tools available to provide automations and the functions of those tools. This can leave users overwhelmed by choice, often leading to an unwillingness to automate processes.

There is a need for a system that enables users to build automations without requiring any technical knowledge, to service a large variety of users, across a range of sophistication levels and backgrounds. Further, there is need for a system that performs consistently over a range of devices (e.g., mobile, desktop) to further enhance accessibility of the automation platform.

The present disclosure provides systems and methods for generating an automated workflow. The systems and methods described herein can generate an automated workflow for a user in response to receiving a workflow generation request from the user. The workflow generation request can be defined as a natural language input from the user that specifies a desired automated operation. The systems and methods described herein can determine the sub-operations (i.e., tasks) required to perform the desired automated operation. A proposed workflow can then be determined to provide the requested automated operation.

The workflow generation request can be defined as a natural language input from a user through a workflow generation user interface. Once a proposed workflow has been determined, a representation of the proposed workflow can be displayed in the workflow generation user interface on a user device. The representation can be displayed to the user in a non-technical, natural language manner so that the user can understand the operations and sub-operations being performed by the automated workflow. The user interface can also allow the user to provide feedback relating to the workflow. The feedback can include, for example, an approval input indicating that the proposed workflow is acceptable to the user. The feedback may also include a workflow modification input, indicating that the workflow and/or one or more sub-operations should be modified to reflect the user's intent associated with the workflow generation request.

Once generated (and optionally once approved), the automated workflow can be stored in a non-transitory workflow storage memory to allow for subsequent execution of the workflow. For instance, the sequence of sub-operations for the automated workflow can be stored in a non-transitory workflow storage memory in response to a user input approving the automated workflow.

Referring now to FIG. 1, shown therein is a block diagram of a system 100 for generating an automated workflow. In the example illustrated, the workflow generation system 100 includes one or more user devices 102, a network 104, one or more servers 106, one or LLMs or generative models 108, and one or more developer devices 110.

Server 106 is a computer server that is connected to network 104. Server 106 has a processor, volatile and non-volatile memory, at least one network interface, and may have various other input/output devices. As with all devices shown in the system 100, there may be multiple servers 106, although not all are shown.

It will be understood that the server 106 need not be a dedicated physical computer. The various logical components that are shown as being provided on or by server 106 may be hosted by a third party "cloud" hosting service such as Amazon™ Web Services™ for example.

Each user device 102 can be associated with a corresponding user. The user device 102 can be used by the user to interact with system 100 in order to initiate the generation of an automated workflow, review a proposed workflow, and approve the proposed workflow or input requested modifications to the proposed workflow. Various different types of users may use the user devices 102 in order to generate automated workflows. Examples of users can include small business owners, managers, developers, content creators, project managers, and event planners.

In general, a user device 102 can be any two-way communication device with capabilities to communicate with other devices. The user device 102 can generally be in communication with (or able to establish communication with) server 106. The user device 102 may send and receive requests to the server 106 using different types of communication channels including text, email, phone call, Voice-over-Internet-Protocol (VoIP), web application, chat application, social media message, etc.

As will be understood, a user device 102 may be any suitable computing device capable of executing an application. User device 102 generally refers to a computing device such as desktop or laptop computers, smartphones, tablet computers, as well as a wide variety of "smart" devices capable of data communication. Like server 106, user devices 102 each include a processor, a volatile and non-volatile memory, at least one network interface, and input/output devices. User devices 102 may be portable, and may at times be connected to network 110 or a portion thereof.

Each of the user devices 102 can have a plurality of software applications operating thereon. The plurality of software applications can include a user workflow generation application that can be used by the user of user device 102 in order to generate an automated workflow. The user workflow generation application can provide a workflow generation user interface that the user can interact with on the user device 102 as part of a process of generating an automated workflow. The workflow generation application may display one or more user interfaces on a display device of the user device 102, including, but not limited to, the example user interface 400 shown in FIG. 4.

The workflow generation application may be a standalone program (or software application) that is downloaded and installed on the user device 102. In other examples, the workflow generation application may be integrated into a third-party software application, which itself, is downloaded and installed on the user device 102 (e.g., through an app store such as the Apple App Store or Google Play).

The workflow generation application may also be a web-based application that is provided through a webpage accessible to the user device 102 through a browser application operating on the user device 102. The browser application may be used at the user device 102 to access the web-based workflow generation application running on server 106.

For example, the server 106 may provide the workflow generation application as a web application that provides the user with the functionality described herein using a web interface. The web interface from server 106 may include one or more user interfaces, including, but not limited to, the example user interface shown in FIG. 4.

Optionally, the user device 102 can interact with the server 106 through an email client application such as Google® Gmail® or others as are known. This may allow the user to initiate, review and approve the generation of an automated workflow using emails sent and received with the server 106.

Optionally, the user device 102 can interact with the server 106 through a Simple Message Service (SMS) client. This may allow the user to initiate, review and approve the generation of an automated workflow using SMS messages exchanged with server 106.

The server 106 may provide an Application Programming Interface (API) endpoint to the user device 102. The API endpoint may be used by an application running on the user device 102 to provide the functionality described herein.

The server 106 can communicate with an omnichannel interface to enable communication between the server 106 and one or more user devices 102. This may allow the server 106 to communicate with the user devices 102 through different communication channels and networks, such as email, SMS, social media messages, application interfaces etc. For example, an API running on the server 106 may use a 3rd party service such as Twilio® to interact with the user device 102, for example, to provide the functionality described herein by text message, WhatsApp® chat, phone call, or VoIP call.

Network 104 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

As shown in FIG. 1, the server 106 is in network communication with the one or more user devices 102, the one or more generative models 108, and the one or more developer devices 110. The server 106 may also include, or be in network communication with, one or more databases that may be queried by the software applications running on the user devices 102 and/or as part of the process of generating an automated workflow and/or executing an automated workflow.

A web application or an Application Programming Interface (API) endpoint hosted by the server 106 can be interacted with by the one or more user devices 102 and the one or more developer devices 110 via network 104. Requests made to the API endpoint of server 106 (e.g. workflow generation requests) may be made in a variety of different formats, such as JavaScript Object Notation (JSON) or extensible Markup Language (XML).

The one or more generative models 108 can be provided by one or more model processors or servers that are in network communication with the server 106. The server 106 can communicate with the generative models to perform various operations as part of a process for generating an automated workflow. Each generative model 108 may be accessed by the server 106 using an API for that generative model 108.

A generative model 108 can use a pre-trained AI model (e.g. GPT-4 or similar) to process inputs from the user device 102 via the server 106 and produce outputs for display on the user device 102. Detailed prompts and predefined crafted prompts provided by the server 106 may enable the models 108 to adapt to the volume and type of input data without making any modifications to its base model. The one or more generative models 108 may include one or more Large Language Models (LLMs), one or more Image Generation Models (IGMs), and one or more Speech Models (SMs).

The one or more generative models 108 may include one or more of the following GPT-2 made by OpenAIR®, GPT-3 made by OpenAIR, GPT-3.5 Turbo made by OpenAIR, Claude 1 made by Anthropic®, Claude 2 made by Anthropic®, BLIP made by Salesforce®, LaMDA (Language Models for Dialog Applications) made by Google®, LLAMA (Large Language Model Meta AI) made by Meta®, GPT-4 made by OpenAIR, GPT-4 Turbo made by OpenAIR, PaLM 2 (Pathways Language Model 2) Google®, Llama 2 made by Meta®, SDXL made by Stability AI®, Dall-E made by OpenAIR, Google Cloud Platform by Google®, ElevenLabs®, D-IDR.

The one or more developer devices 110 may be desktop computers or laptop computers that are in network communication with server 106 and may be used for the configuration and administration of the application on server 106. Optionally, the developer devices 110 may be omitted. In some cases, configuration and administration of the application on server 106 may be performed using a user device 102, for instance having an administrator or developer application operating thereon and/or being associated with administrator or developer credentials to provide added functionality to the user of user device 102.

Figure 2:
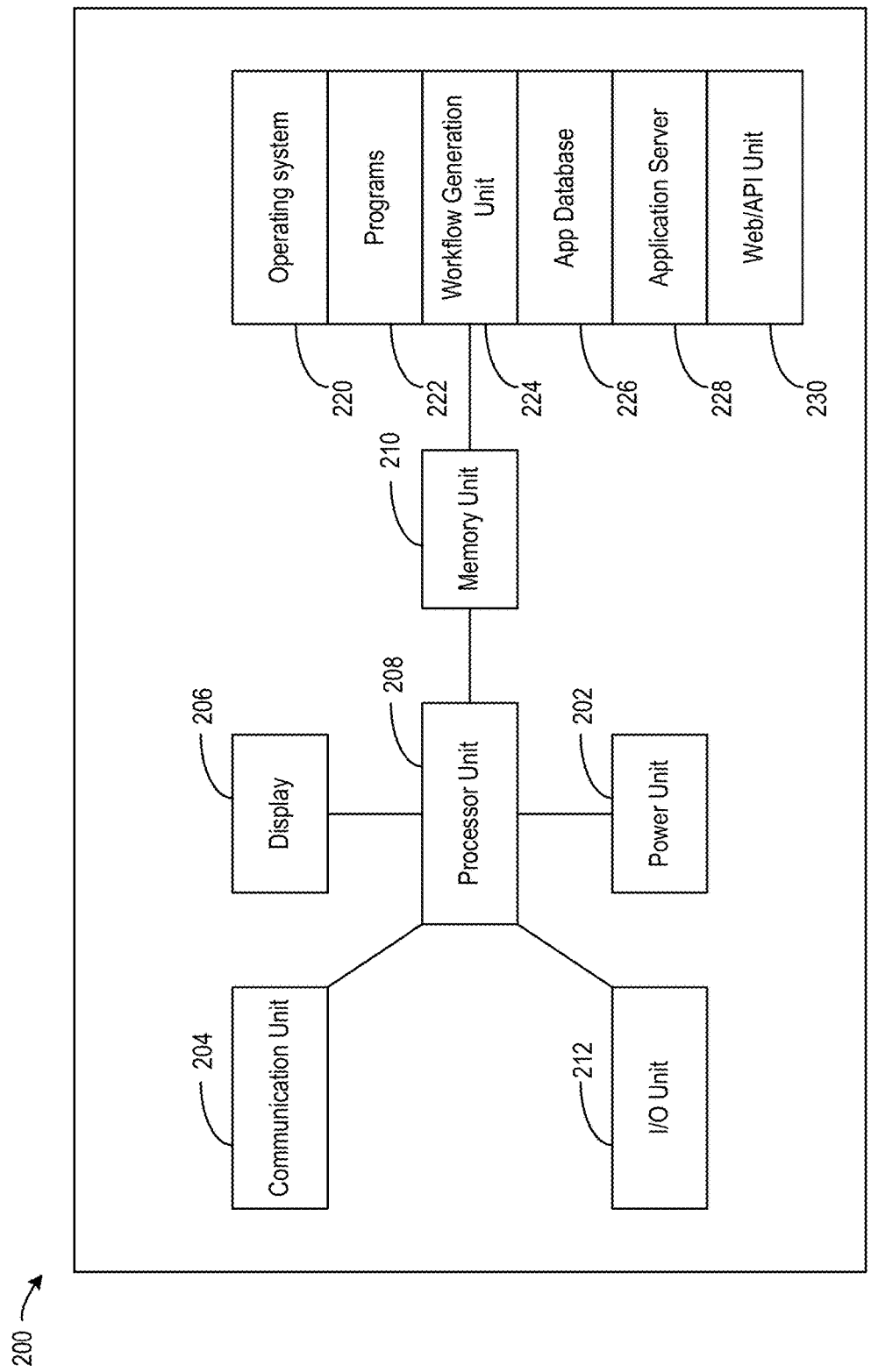
FIG. 2 is a block diagram of an example computing device that can be used in the example system of FIG. 1.

Referring now to FIG. 2, shown therein is a block diagram 200 of an example computing system that may be used, for example, as a server 106 in system 100. As shown in the example of FIG. 2, the server 200 includes a communication unit 204, display 206, processor unit 208, memory unit 210, I/O unit 212, and power unit 202.

The communication unit 204 can include wired or wireless network connection capabilities. The communication unit 204 can include a radio that communicates using standards such as IEEE 802.11a, 802.11b, 802.11g, or 802.11n. The communication unit 204 can be used by the server 106 to communicate with other devices or computers, such as a user device 102 and/or generative model 108. Communication unit 204 may communicate with a network, such as network 104 in system 100.

The display 206 may be an LED, LCD, or OLED based display and may be a touch sensitive user input device that supports gestures. Optionally, display 206 may be omitted, for instance where the server 200 is a virtual server or is accessed through a separate device such as a user device 102 or developer device 110.

The processor unit 208 controls the operation of the server 106. The processor unit 208 can be any suitable processor(s), controller(s) or digital signal processor(s) that can provide sufficient processing power depending on the configuration, purposes and requirements of the server 106 as is known by those skilled in the art. For example, the processor unit 208 may be a high-performance general processor. Alternatively or in addition, the processor unit 208 can include more than one processor with each processor being configured to perform different dedicated tasks. Alternatively or in addition, the processor unit 208 may include a standard processor, such as an Intel® processor or an AMD® processor.

The memory unit 210 can include RAM, ROM, one or more hard drives, one or more flash drives or some other suitable data storage elements such as disk drives, etc. The memory unit 210 is used to store an operating system 220 and programs 222 as is commonly known by those skilled in the art. The memory unit 210 further stores software code for implementing an intent determining unit 224, a system of record unit 226, an application database 228, an application server 230, and a web/API unit 232.

The I/O unit 212 can include at least one of a mouse, a keyboard, a touch screen, a thumbwheel, a trackpad, a trackball, a card-reader, an audio source, a microphone, voice recognition software and the like again depending on the particular implementation of the server 106. Optionally, some of these components can be integrated with one another. Optionally, the I/O unit 212 may be omitted from server 106.

The power unit 216 can be any suitable power source that provides power to the server 106 such as a power adaptor or a rechargeable battery pack depending on the implementation of the server 106 as is known by those skilled in the art.

The operating system 220 may provide various basic operational processes for the server 200. For example, the operating system 220 may be a server operating system such as Ubuntu® Linux, Microsoft® Windows Server® operating system, or another operating system.

The programs 222 include various user programs. They may include several hosted applications delivering services to users over the network, for example, a marketing customer relations management (CRM) system.

The workflow generation unit 224 can be configured to manage and perform a process of generating an automated workflow. The workflow generation unit 224 can transmit and receive requests to and from a Web/API unit 230 using communication unit 204.

The app database 228 can store data usable during the generation or execution of an automated workflow. That is, the app database 228 can store data that is used directly, or identifies a location of data that can be used directly when an automated workflow is executed.

For example, the app database 228 may provide access data/information about one or more connected systems accessible to the server 200. The connected systems can include internal databases and systems connected to the server 200 that store data and/or functions that can be used as part of the generation or execution of an automated workflow flow. Alternatively or in addition, the connected systems may refer to external or third-party systems that may be accessible to server 200 using the access data/information. For example, the access data for a connected system may include connection information such as URLs, or other connection identifiers.

Optionally, the access data may include connected system credential data usable or required to access a connected system. For example, the connected system credential data may include user authentication data such as usernames and passwords associated with the server 106 and/or a user of user device 102.

The application database 228 may also include a knowledge base (e.g. a database) storing data associated with each user and/or an organization associated with each user. The stored data may include or be extracted from documents relating to the user and/or organization. The stored data can be indexed and/or otherwise pre-processed to facilitate subsequent analysis and retrieval. For example, data stored in the knowledge base may be provided in summarized form with a link or pointer to the complete data source (e.g. a document on an original system, a web page URL, etc.). Examples of data and documents that may be contained within the knowledge base can include Portable Document Format (PDF) files, Word® files i.e., docx, text files, web pages, zip files and/or image files such as PNG files, JPEG files, GIF files, etc.

As noted, the knowledge base stored by the application database 228 may be specific to a particular user and/or an organization associated with a user. The application database 228 can store multiple distinct knowledge bases related to individual users and/or individual organizations. While the type of data stored within the different knowledge bases may be similar, or in some cases essentially the same, the content of the data may be unique to a given knowledge base. For example, the application database 228 may store knowledge bases for multiple property management organizations. A list of past rent statements for a particular property may be accessible to a first user through the knowledge base associated with that user (or their organization), while a separate list of past rent statements may be accessible to another user.

The application server 230 may be responsible for servicing user requests that are received, including providing functionality via the web/API unit 232. The Application Server 230 may be a commercially available server such as Apache Tomcat, Microsoft IIS, or Django or any other server that has a similar capability. The Application Server 230 may receive a user request through the web/API unit 232 from the communication unit 204 that includes a text-based portion.

The Web/API Unit 232 may be a web-based application or Application Programming Interface (API) such as a REST (REpresentational State Transfer) API. The API may communicate in a format such as XML, JSON, or other interchange format. The Web/API unit 232 may be provided by the application server 230.

Figure 3:
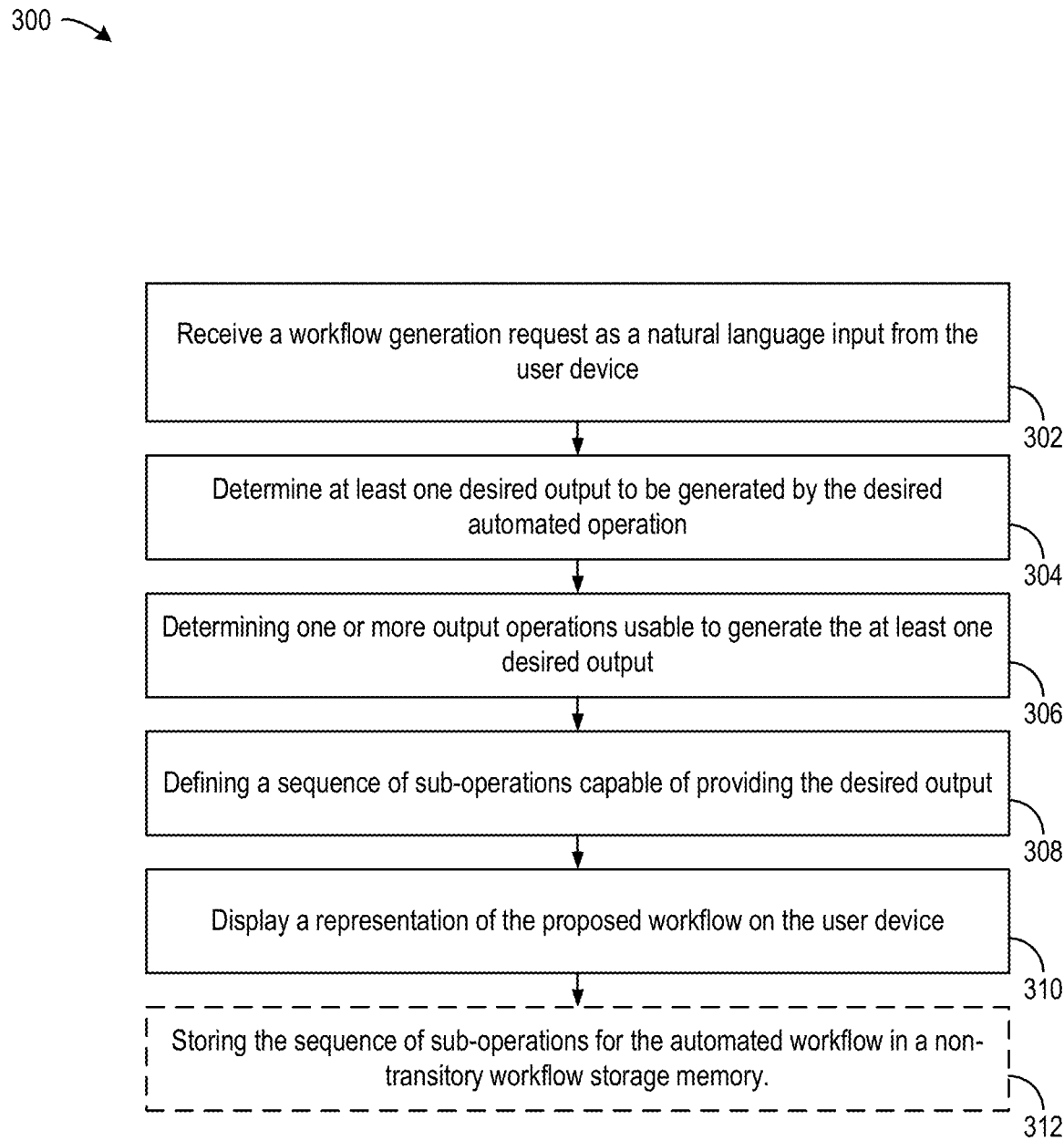
FIG. 3 a flowchart illustrating an example method of generating an automated workflow.

Referring now to FIG. 3, there is shown a flowchart illustrating a method 300 for generating an automated workflow. The method 300 may be carried out by various components of the systems 100 and 200, such as the workflow generation unit 224 on server 106 and the user device 102.

At 302, a workflow generation request can be received from a user device. The workflow generation request can be provided as a textual natural language input from the user device. The natural language input may be a plain-text description of an automation the user is desiring to create. Alternatively or in addition, the natural language input may be a voice input translated to text using appropriate voice-to-text translation software.

The workflow generation request can define a desired automated operation for the user. The desired automated operation generally refers to an operation or task or process that a user of the user device desires to be performable in an automated and repeatable manner by executing an automated workflow.

The workflow generation request can be input/received through a workflow generation user interface on the user device. The workflow generation request can be defined by a user as a plain text description of the desired automation operation.

Figure 4:
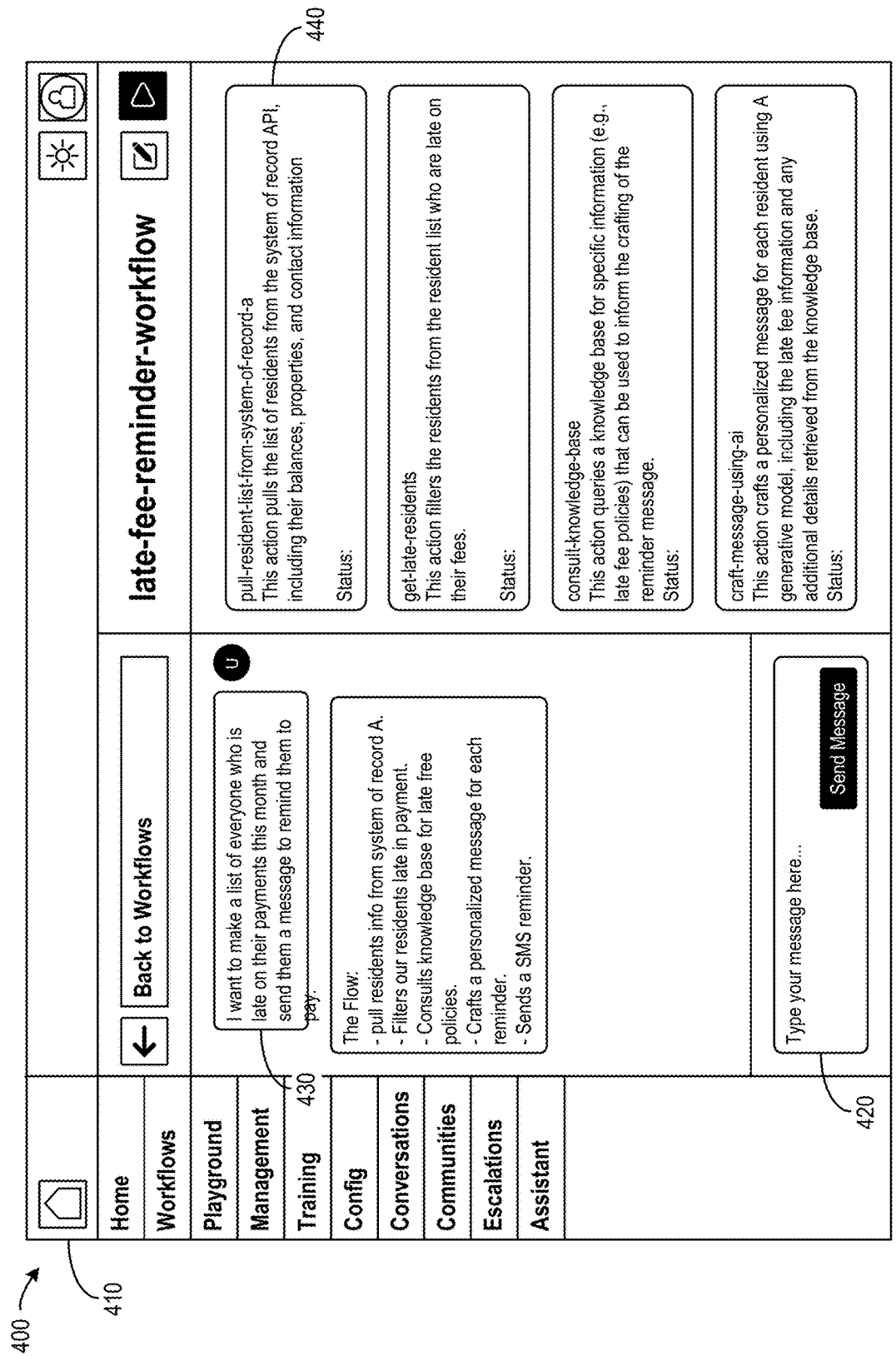
FIG. 4 is an example user interface that may be displayed on a user device during an example method of generating an automated workflow.

Optionally, the workflow generation user interface can be a graphical user interface 410 as shown in the example of FIG. 4. The workflow generation user interface 410 may include various interactable fields that allow a user to input a workflow generation request and provide feedback in response to receiving a proposed automated workflow.

For example, the workflow generation user interface 410 may include an input field or region 420. A user can interact with the input region 420 to provide inputs through an input device on the user device 102 in order to define and input a workflow generation request. For example, a user may input a workflow generation request by typing a message into input field 420 using a keyboard or touchscreen input.

The workflow generation user interface 410 can also display the workflow generation request once it has been received. This can provide a user with a visual reminder of the user's definition of the operation to be automated. For example, after inputting the workflow generation request at input field 420, the workflow generation request may be displayed in the workflow generation user interface 410 as a message 430 in a conversation.

For example, a workflow generation request may be defined by as a user as "I want to make a list of everyone who is late on their payments this month and send them a text to remind them to pay" as shown in the message 430 in FIG. 4. The request can then be parsed to determine, for example, that the desired automated operation defined by the workflow generation request includes sending a reminder to all residents who have late payments for the current month.

The server 106 (e.g. workflow generation unit 224) can be configured to receive the workflow generation request including the natural language input from the user device 102. The workflow generation unit 224 can then initiate the process of generating a proposed workflow that is intended to provide the desired automated operation for the user. For example, the workflow generation unit 224 may transmit the workflow generation request to a generative model 108 to determine the desired automated operation that corresponds to the workflow generation request.

The received workflow generation request may be stored on the server 200 (e.g. in app database 228) while the process of generating a proposed workflow is carried out. Optionally, the received workflow generation request may be stored by the server 200 persistently once the corresponding automated workflow has been generated. The automated workflow and corresponding workflow generation request can be associated with one another, which may enable the server 106 to use the automated workflow to respond to similar subsequent automated workflow requests from other user devices 102.

In response to receiving the workflow generation request, an automated workflow can be determined. As noted above, the workflow generation request may be initially parsed to determine the operation that is intended by the user. The automated workflow can then be determined as a sequence of sub-operations required to perform the desired automated operation.

The sub-operations generally refer to individual actions that are collectively required to provide the desired automated operation. For example, actions can include but are not limited to retrieving a document from a database, extracting data from a database (or from a document within a database), manipulating data in the retrieved documents (or extracted data), engaging third-party applications to perform a task, generating message content, transmitting messages through a communication interface etc. The sub-operations can be arranged into a specified sequenced such that, when performed in the specified order, the desired automated operation is performed.

The workflow generation unit can determine an automated workflow as a sequence of sub-operations required to perform a desired automated operation. The workflow generation unit may provide a central API that provides access to multiple different applications and generative models 108, such as Amazon Bedrock for example. Alternatively or in addition, the workflow generation unit 224 may include or access for example, a Large Language Model (LLM) such as one the one or more generative models 108. The generative models 108 can be used, for example, to determine an intended automated operation defined by a workflow generation request and initiate the process of generating an automated workflow.

At 304, at least one desired output can be determined based on the natural language input. The at least one desired output refers to the output that a user intends to result from the execution of the requested automated workflow. For example the workflow generation unit 224 can determine, based on processing or parsing the natural language input received at 304, at least one desired output to be generated by the desired automation operation.

In the example given above, the at least one output of the desired automated operation is a payment reminder message sent to a set of identified user. The particular form of the message and the manner of the message transmission can vary. Accordingly, the server 106 may identified a plurality of potential outputs for the desired automated operation. In general, however, the at least one output of the desired operation can be identified as the transmission of a payment reminder message to the set of identified users.

At 306, one or more output operations useable to generate the at least one desired output is determined. An output operation can refer to a final operation that is able to generate a desired output of the at least one desired output from 304. For example, an output operation that transmits a message to a specified user can include sending a text message, sending an email, or sending a message to a user within an application.

In some cases, multiple output operations may be included in an automated workflow. For example, different users may receive messages through different communication channels. Accordingly, separate output operations for sending a text message, sending an email, sending a message in an application etc. may be included in the same automated workflow.

Optionally, the output operations may be conditional or dependent on execution of earlier sub-operations within the automated workflow. For instance, the specific manner of sending a reminder message to a user may depend on the user to whom the message is being sent. In the context of sending a late payment reminder, the set of users to whom the message is being sent can vary between executions of the workflow such that different output operations may be engaged depending on the identified set of users.

At 308, the sequence of sub-operations required to perform the desired automated operation can be determined. The sequence of sub-operations can be defined to include a plurality of sub-operations arranged into a sequence, concluding with the one or more output operations from 306.

The sequence of sub-operations can be defined as the sequence of actions that are required to translate any inputs received at the time of executing the automated workflow into the desired set of outputs. For instance, for a late payment reminder message the workflow execution request may not include any explicit inputs, however the date of execution may be an implicit input to the workflow. The set of actions may then include identifying residents associated with a specific property, determining property and payment data associated with the residents at the given date of execution, identifying the subset of residents who are late on a specific payment, identifying property-specific rules or regulations relating to late payments stored in a knowledge base, generating a reminder message for each user in the subset of users based on the property-specific rules or regulations and the property and payment data for those users (e.g. by prompting a generative model 108 to prepare a reminder message), determining message transmission data for each user in the subset of users (e.g. a communication channel such as text or email and the user's relevant address), and transmitting the user-specific reminder message in accordance with the message transmission data. It should be appreciated that the preceding actions are merely exemplary and more, fewer or different actions may be used to provide the same desired automated operation. Furthermore, it should be understood that some of the described operations may be performed as a combined operation (e.g. retrieving a list of residents and the associated property and payment data).

As noted above, determining the sequence of sub-operations may include determining one or more workflow inputs expected to be received in conjunction with a request to execute the automated workflow. Optionally, the automated workflow can be defined to confirm or validate that the necessary workflow inputs are received when a request to execute the automated workflow is received. The automated workflow can include an input prompt that prompts a user to provide the necessary workflow inputs either whenever the workflow execution request is received or when the process of validating the necessary workflow inputs indicates that a necessary input is missing.

The desired output and the one or more operation inputs can be determine based on parsing of the workflow generation request. For example, the workflow generation request may be provided to a natural language processing model or large language model, such as generative models 108, to determine the intended output and any operation inputs to be used by the intended automated operation defined by the workflow generation request.

In some cases, it may be possible for multiple alternative workflows to achieve the same desired automated operation. In such cases, the system may simply select the first suitable workflow identified. Alternatively, the alternative workflows may be evaluated and a preferred workflow may be selected (e.g. based on resource consumption levels, execution time, or other criteria).

To ensure that the sequence of sub-operations is usable, a sequence of intermediate inputs and intermediate outputs for each sequential pair of sub-operations within the sequence of sub-operations may be validated. Intermediate outputs from an upstream sub-operation may be validated to ensure that they are useable by or for a downstream sub-operation in the sequence of sub-operations. For example, a first sub-operation may include retrieving a list of residents managed by a property manager. The retrieved listed of residents may be used in a second sub-operation which may require filtering the retrieved list to identify residents that are late on their payments.

Optionally, determining the sequence of sub-operations may include identifying one or more user-specific data repositories associated with a user of the user device and/or an associated organization. The user-specific data repositories can include a user or organization-specific knowledge base stored by the server 106. The user-specific data repositories can also include external databases, such as may be provided by third-party applications for which the user has an account or authorization to access those applications. Examples of external user-specific data repositories include Gmail, Excel, Twilio, Dropbox, Calendly, Sharepoint, Hubspot, Linkedin, etc. as well as any external software applications or systems that a user identifies as part of a user profile managed by server 106, including for instance systems with closed APIs such as the example property management systems Vantaca, CINC, Yardi, etc. The server 106 may store a set or list of user-specific data repositories associated with each user and/or organization within the knowledge base for the corresponding user and/or organization.

In order to provide the desired automated operation, access to a user-specific data repository may be required. To enable the automated workflow to access the user-specific data repository, a user-specific integration sub-operation can be defined. A user-specific integration sub-operation can be defined such that the sub-operation includes accessing the corresponding user-specific data repository including defining any necessary application programming interface (API) calls required to access the corresponding user-specific data repository (and also to perform the requisite action in relation to that user-specific data repository). The user-specific integration sub-operation can also be defined to include, or retrieve, any required user credentials or other authentication data in order to access the user-specific data repository and also to perform the requisite action in relation to that user-specific data repository.

For example, a sub-operation may require access to a third-party application (e.g., email services, systems of records, messaging platforms) requiring user authentication. The user-specific integration sub-operation can access user credential or authentication data stored for the third-party application such that authentication is not required every time the desired automation is executed.

Further examples of user-specific integration sub-operations may include access to closed API services (e.g., paid subscription services that are only available to users subscribed to the service) and/or private databases that have user access controls (e.g. private spreadsheet containing the details of residents that only a property manager can access).

In some cases, user-specific integration sub-operations may include access to a user-specific data repository or third-party application that does not provide an API (or does not expose their API). Accordingly, user-specific sub-operations can be defined to access the user-specific data repository or third-party application without using an API.

For example, a user-specific integration sub-operation can be defined to include a scripted integration. The scripted integration can be defined to execute a script defining a sequence of scripted actions that provide access to a user-specific data repository or third-party application, e.g. using user credentials stored by server 106. The scripted integration can also include scripted actions such as retrieving or inputting specified data and/or scraping data from specified data locations.

Alternatively or in addition, a user-specific integration sub-operation can be defined to include a direct database access operation. The direct database access operation can be defined to establish a direct connection with a database without using an API, for instance to access specified database fields. The direct database access operation can transmit queries and/or commands to the database once a direct connection has been established. The database may then return requested information (e.g. in response to a query) or perform a desired database operation (in response to a command).

Optionally, a user may require authentication in order to generate an automated workflow that includes a user-specific integration sub-operation (or at least a user-specific integration sub-operation requiring user authentication or credentials). Accordingly, a user may be required to undergo an authentication process during the creation of the automated workflow.

Alternatively or in addition, a user may require authentication in order to execute an automated workflow that includes a user-specific integration sub-operation (or at least a user-specific integration sub-operation requiring user authentication or credentials). Accordingly, a user may be required to undergo an authentication process prior to the execution of the automated workflow.

Optionally, a user may not be required to undergo an authentication process each time an automated workflow is generated or executed. For example, the server 106 may store application-specific keys and/or credentials for a user that can be used to automatically authenticate use of a user-specific integration sub-operation on behalf of the user.

Optionally, a plurality of available sub-operations can be predefined and stored in a sub-operation database (e.g. on server 106). The sequence of sub-operations can then be determined from the plurality of available sub-operations stored in the sub-operation database. The sequence of available sub-operations from the sub-operation database usable to perform the desired automated operation can then be defined as the sequence of sub-operations for the automated workflow.

The plurality of available sub-operations can be defined based on actions that can be performed by the server 106 using the applications and data repositories available to the user through the server 106. That is, the plurality of available sub-operations may be user-specific and include a subset of all of the sub-operations that the server 106 is capable of performing.

The plurality of available sub-operations can include sub-operations that were previously utilized by a user (either the same or a different user). For example, such sub-operations may correspond to a workflow automation that was previously generated and executed by the user or another user. The plurality of available sub-operations can also include frequently used sub-operations across different workflow operations (e.g., craft a personalized message using a generative model).

Optionally, the sequence of sub-operations can include a sequence of application programming interface (API) calls to a plurality of different operational applications. For example, API calls can be made to third-party applications to retrieve information, perform actions, integrate between systems, provide real-time updates, and request authentication.

At 310, a representation of the automated workflow can be displayed in the workflow generation user interface 410 on the user device. The representation of the automated workflow can provide an indication to the user of the automated actions that will be performed when the automated workflow is executed. The representation of the automated workflow can allow the user to ensure that the desired automated operation will be performed by the proposed automated workflow. Displaying the representation of the proposed workflow can also allow the user to provide feedback, for instance where the proposed workflow does not accurately reflect the user's desired automated operation.

The representation of the automated workflow can include displaying the sequence of sub-operations identified for the automated workflow. This can provide the user with a fuller understanding the process that is being performed during the automated workflow. This may provide users with greater certainty and belief that the automated workflow will accurately perform the operation they desire to automate. As shown in the example of FIG. 4, the workflow generation user interface 410 include the sequence of sub-operations 440 ordered in the sequence they are to be performed.

Optionally, a natural language description of the sequence of sub-operations to be performed in the automated workflow can be generated and displayed to the user. This can provide a user with a general understanding of the operation that has been automated. This may allow the user to ensure that their original intent has been reflected in the final automated workflow.

For example, in response to the workflow generation request 430, the workflow generation unit 224 may respond with a message 430 which describes the automated workflow to the user in plain-text as shown in the example of FIG. 4. The workflow description message 432 may help the user confirm that that the automated workflow is performing all the desired actions.

The displayed automated workflow description may also provide a plain-text summary detailing the desired output performed by the sub-operation. The provided summary may be based on the natural language input provided in the workflow generation request.

Optionally, a natural language description of each individual sub-operation can be generated. The natural language description of an individual sub-operation can be displayed in the workflow generation user interface in associated with the corresponding sub-operation. This can provide a user with a more granular understanding of the process performed by the automated workflow, which may provide further certainty that the desired actions are being performed correctly.

In some cases, the workflow description and/or the sub-operation description presented to the user may indicate or suggest to the user that the proposed workflow is insufficient or inaccurate. The user may interact with the workflow generation user interface (e.g. by providing an input at input field 420) to modify the proposed workflow.

For example, a user may provide a workflow modification input through the workflow generation user interface. The workflow modification input may be provided/received in response to displaying the natural language description of the automated workflow and/or sequence of sub-operations. The workflow modification input can define a desired modification to the sequence of sub-operations as a modification textual natural language input from the user device. That is, the workflow modification input can include a user indicating that the proposed workflow is inaccurate or incomplete. The workflow modification input may also indicate a modification or modifications that are required to provide the user's desired automated operation.

A modified sequence of sub-operations can then be determined by modifying the sequence of sub-operations in the proposed automated workflow in response to the workflow modification input. Modifying the sequence of sub-operations can be performed in generally the same manner as determining the initial sequence of sub-operations, with the added information provided in the workflow modification input.

Optionally, the server 106 may determine that further information or details may be required to generate the automated workflow. In such cases, an information request prompt may be provided through the workflow user interface requesting that the user provide further details or information to clarify or amend the workflow generation request. For example, the workflow generation unit 224 may require more information as to which email service to use if a particular use has multiple email accounts registered. The workflow generation unit 224 may prompt the user asking them to select which email service to use for the particular workflow generation. The system can then update the automated workflow request to enable the automated workflow to be generated in accordance with the updated information provided by the user.

At 312, the sequence of sub-operations for the automated workflow can be stored in a non-transitory workflow storage memory. The stored sequence of sub-operations can be retrieved in response to a subsequent request to execute the workflow. For example, the sequence of sub-operations may be stored in a sub-operation database accessible to the server 106.

Optionally, the sequence of sub-operations may be stored only once a user validation input has been received indicating that the automated workflow has been approved or accepted by the user. For example, a workflow validation prompt may be provided to the user in association with the representation of the proposed workflow. The workflow validation prompt can prompt a user to indicate whether the proposed workflow is acceptable to the user. The user can provide a user validation input via the workflow generation user interface in response to the workflow validation prompt. The sequence of sub-operations for the automated workflow can then be stored in response to receiving the user validation input.

In some cases, a modified sequence of sub-operations for the proposed automated workflow may be stored a non-transitory workflow storage memory. This may occur, for instance, where a user has reviewed an initial proposed automated workflow and provided a modification input requiring modifications to the initial sequence of sub-operations. Optionally, the modified sequence of sub-operations may be stored only once a user validation input has been received indicating that the modified automated workflow has been approved or accepted by the user.

Once the automated workflow has been generated, the server 106 may execute the sequence of sub-operations in response to a request to execute the automated workflow. For example, after the automated workflow has been generated and the user is satisfied with the result, the user may input a command or request to the server 106 to execute the automated workflow.

Optionally, a user may specify an execution routine for the automated workflow. For example, the automated workflow may be scheduled to execute at a regular time (e.g. 1 day or 1 week after a payment due date to send a payment reminder) such that the user does not need to manually cause the workflow to execute. This may further streamline the task automation process for a user.

Optionally, a stored automated workflow may be stored by the server 106 as an automated workflow template. The automated workflow template may be used to respond to workflow generation requests received from the same or other users. This may simplify the process of responding to a subsequent workflow generation request. The automated workflow template can be defined using placeholders or pointers to any user-specific integrations to allow those user-specific integrations to be modified for the user who submits the subsequent workflow generation request.

The automated workflow template may be stored in association with the original workflow generation request that resulted in the corresponding automated workflow. This may allow the server 106 to automatically identify the automated workflow template in response to receiving a subsequent workflow generation request that is the same, or substantially similar to, the original workflow generation request.

Although the method 300 has been described in the context of a graphical workflow generation user interface displayed on a user device, it should be understood that the steps of method 300 can also be performed using a textual interface on a user device. For instance, the steps of method 300 may be performed for a user communicating through an interface provided by an SMS application, email client application or the like without the need for a graphical user interface.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of examples, it will be appreciated that some features and/or functions of the described examples are susceptible to modification without departing from the spirit and principles of operation of the described examples. For example, the various characteristics which are described by means of the represented examples or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred examples and examples, but should be given the broadest interpretation consistent with the description as a whole.

The invention claimed is:

1. A computer-implemented method for generating an automated workflow, the method comprising:
   receiving a workflow generation request through a workflow generation user interface on a user device, the workflow generation request defining a desired automated operation, wherein the workflow generation request is received as a textual natural language input from the user device;
   determining a proposed automated workflow as a sequence of sub-operations required to perform the desired automated operation, wherein determining the sequence of sub-operations comprises:
   determining, based on the natural language input, at least one desired output to be generated by the desired automated operation;
   determining one or more output operations usable to generate the at least one desired output; and
   defining the sequence of sub-operations to include a plurality of sub-operations arranged into a sequence concluding with the one or more output operations;
   displaying a representation of the proposed automated workflow in the workflow generation user interface on the user device.

2. The method of claim 1, further comprising storing the sequence of sub-operations for the proposed automated workflow in a non-transitory workflow storage memory.

3. The method of claim 1, further comprising automatically executing the sequence of sub-operations in response to a request to execute the automated workflow.

4. The method of claim 1, wherein the sequence of sub-operations comprises a sequence of application programming interface (API) calls to a plurality of different operational applications.

5. The method of claim 1, wherein determining the sequence of sub-operations further comprises:
   identifying one or more user-specific data repositories associated with a user of the user device;

defining one or more user-specific integrations for one or more sub-operations in the sequence of the sub-operations, wherein each user-specific integration specifies that the sub-operation is to be performed using a corresponding user-specific data repository corresponding to that sub-operation and defines any necessary application programming interface (API) calls required to access data from the corresponding user-specific data repository.

6. The method of claim 1, wherein a plurality of available sub-operations are predefined and stored in a sub-operation database, and determining the sequence of sub-operations comprises identifying a sequence of available sub-operations from the sub-operation database usable to perform the desired automated operation.

7. The method of claim 6, wherein determining the sequence of sub-operations comprises:
determining one or more operation inputs expected to be received in conjunction with a request to execute the automated workflow; and
determining the sequence of available sub-operations from the sub-operation database usable to generate the desired output based on the one or more operation inputs.

8. The method of claim 7, wherein the desired output and the one or more operation inputs are determined based on parsing of the workflow generation request.

9. The method of claim 7, further comprising automatically determining the one or more operation inputs in response to a request to execute the automated workflow.

10. The method of claim 1, further comprising validating a sequence of intermediate inputs and intermediate outputs for each sequential pair of sub-operations within the sequence of sub-operations.

11. The method of claim 1, further comprising:
displaying, in the workflow generation user interface on the user device, the sequence of sub-operations identified for the automated workflow.

12. The method of claim 1, further comprising:
generating a natural language description of the sequence of sub-operations identified for the automated workflow; and
displaying, in the workflow generation user interface on the user device, the natural language description of the sequence of sub-operations.

13. The method of claim 12, further comprising:
displaying, in the workflow generation user interface on the user device, a workflow validation prompt in association with displaying the natural language description;
receiving, via the workflow generation user interface, a user validation input using the workflow validation prompt; and
storing the sequence of sub-operations for the automated workflow in response to receiving the user validation input.

14. The method of claim 12, further comprising:
receiving, a workflow modification input through the workflow generation user interface in response to displaying the natural language description of the sequence of sub-operations, wherein the workflow modification input defines a desired modification to the sequence of sub-operations as a modification textual natural language input from the user device;
determining a modified sequence of sub-operations by modifying the sequence of sub-operations in the proposed automated workflow in response to the workflow modification input; and
storing the modified sequence of sub-operations for the proposed automated workflow in a non-transitory workflow storage memory.

15. A system for generating an automated workflow, the system comprising:
a processor; and
a non-transitory storage memory;
wherein the processor is configured to:
receive a workflow generation request through a workflow generation user interface on a user device in communication with the processor, the workflow generation request defining a desired automated operation, wherein the workflow generation request is received as a textual natural language input from the user device;
determine a proposed automated workflow as a sequence of sub-operations required to perform the desired automated operation, wherein determining the sequence of sub-operations comprises:
determining, based on the natural language input, at least one desired output to be generated by the desired automated operation;
determining one or more output operations usable to generate the at least one desired output; and
defining the sequence of sub-operations to include a plurality of sub-operations arranged into a sequence concluding with the one or more output operations; and
transmit a representation of the proposed automated workflow to the user device whereby the representation of the proposed automated workflow is displayable in the workflow generation user interface on the user device.

16. The system of claim 15, wherein the processor is further configured to store the sequence of sub-operations for the proposed automated workflow in the non-transitory storage memory.

17. The system of claim 15, wherein the processor is further configured to automatically execute the sequence of sub-operations in response to a request to execute the automated workflow.

18. The system of claim 15, wherein the sequence of sub-operations comprises a sequence of application programming interface (API) calls to a plurality of different operational applications.

19. The system of claim 15, wherein the processor is further configured to determine the sequence of sub-operations by:
identifying one or more user-specific data repositories associated with a user of the user device; and
defining one or more user-specific integrations for one or more sub-operations in the sequence of the sub-operations, wherein each user-specific integration specifies that the sub-operation is to be performed using a corresponding user-specific data repository corresponding to that sub-operation and defines any necessary application programming interface (API) calls required to access data from the corresponding user-specific data repository.

20. The system of claim 15, wherein a plurality of available sub-operations are predefined and stored in the non-transitory storage memory, and the processor is configured to determine the sequence of sub-operations by identifying a sequence of available sub-operations from the non-transitory storage memory usable to perform the desired automated operation.

21. The system of claim 20, wherein the processor is configured to determine the sequence of sub-operations by:
   determining one or more operation inputs expected to be received in conjunction with a request to execute the automated workflow; and
   determining the sequence of available sub-operations from the sub-operation database usable to generate the desired output based on the one or more operation inputs.

22. The system of claim 21, wherein the processor is configured to determine the desired output and the one or more operation inputs based on parsing of the workflow generation request.

23. The system of claim 21, wherein the processor is configured to automatically determine the one or more operation inputs in response to a request to execute the automated workflow.

24. The system of claim 15, wherein the processor is configured to validate a sequence of intermediate inputs and intermediate outputs for each sequential pair of sub-operations within the sequence of sub-operations.

25. The system of claim 15, wherein the processor is configured to:
   transmit the sequence of sub-operations identified for the automated workflow to the user device whereby the sequence of sub-operations is displayable in the workflow generation user interface on the user device.

26. The system of claim 15, wherein the processor is configured to:
   generate a natural language description of the sequence of sub-operations identified for the automated workflow; and
   transmit the natural language description of the sequence of sub-operations to the user device whereby the natural language description of the sequence of sub-operations is displayable in the workflow generation user interface on the user device.

27. The system of claim 26, wherein the processor is configured to:
   receive, via the workflow generation user interface, a user validation input provided in response to a workflow validation prompt displayed within the workflow generation user interface in association with displaying the natural language description; and
   store the sequence of sub-operations for the automated workflow in response to receiving the user validation input.

28. The system of claim 26, wherein the processor is configured to:
   receive, a workflow modification input through the workflow generation user interface following transmission of the natural language description of the sequence of sub-operations to the user device, wherein the workflow modification input defines a desired modification to the sequence of sub-operations as a modification textual natural language input from the user device;
   determine a modified sequence of sub-operations by modifying the sequence of sub-operations in the proposed automated workflow in response to the workflow modification input; and
   storing the modified sequence of sub-operations for the proposed automated workflow in the non-transitory storage memory.

29. A computer program product for generating an automated workflow, the computer program product comprising a non-transitory computer readable medium having computer executable instructions stored thereon, the instructions for configuring one or more processors to perform a method of generating the automated workflow, wherein the method comprises:
   receiving a workflow generation request through a workflow generation user interface on a user device, the workflow generation request defining a desired automated operation, wherein the workflow generation request is received as a textual natural language input from the user device;
   determining a proposed automated workflow as a sequence of sub-operations required to perform the desired automated operation, wherein determining the sequence of sub-operations comprises:
   determining, based on the natural language input, at least one desired output to be generated by the desired automated operation;
   determining one or more output operations usable to generate the at least one desired output; and
   defining the sequence of sub-operations to include a plurality of sub-operations arranged into a sequence concluding with the one or more output operations; and
   displaying a representation of the automated workflow in the workflow generation user interface on the user device.

* * * * *